Patented Dec. 19, 1933

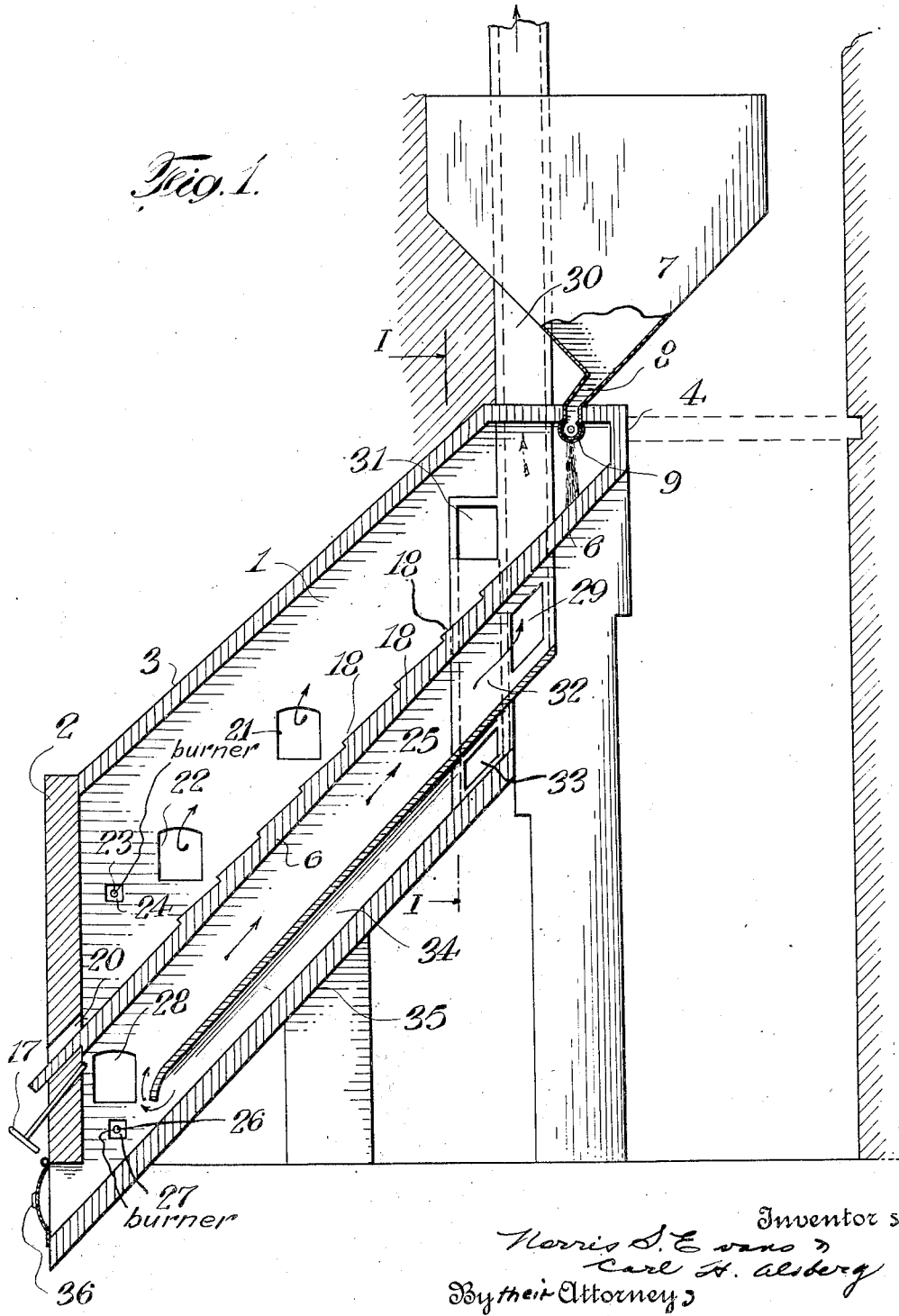

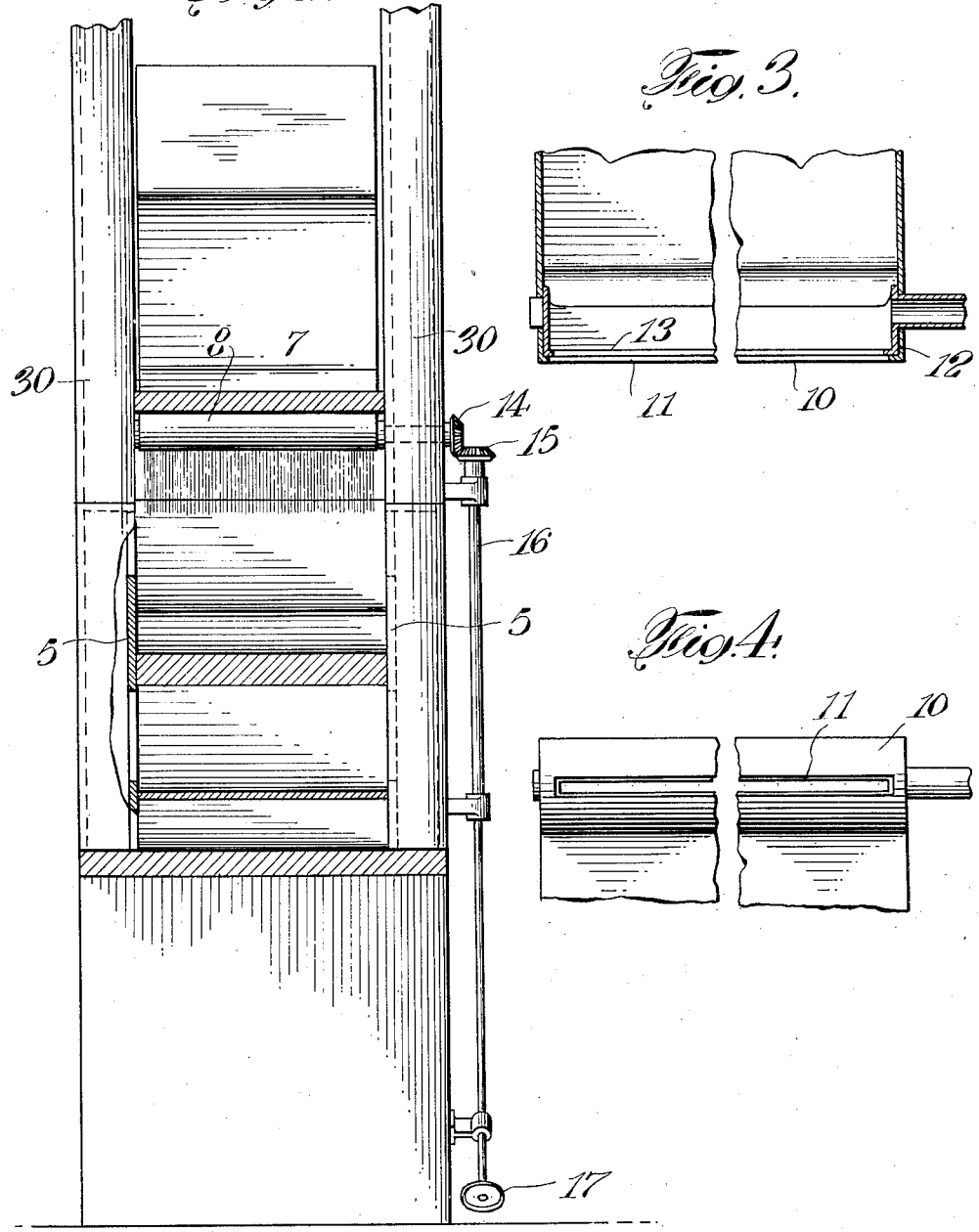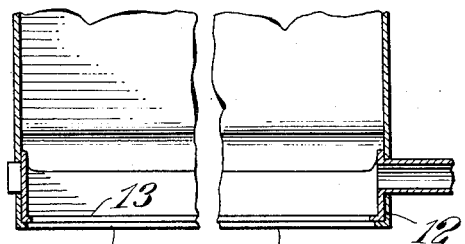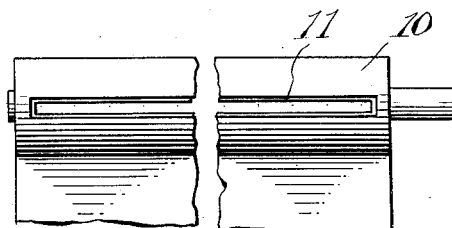

1,939,678

UNITED STATES PATENT OFFICE 1,939,678

FURNACE FOR CONDITIONING ADSORBENT MATERIALS

Norris S. Evans, Petrolia, and Carl H. Alsberg, Franklin, Pa., assignors to L. Sonneborn Sons, Inc., a corporation of New York Application October 20, 1928. Serial No. 313,709

8 Claims. (Cl. 202—129)

This invention relates to apparatus for conditioning adsorbent materials and will be understood from the following description read in conjunction with the drawings in which;

Fig. 1 is a vertical section through a preferred embodiment of our invention;

Fig. 2 is a vertical section through Fig. 1 on the plane denoted by the line I—I;

Fig. 3 is a vertical section through a part of Fig. 1; and

Fig. 4 is a bottom view of Fig. 3.

The expression adsorbent materials as herein employed denotes the various solids, such as clay, fuller's earth, bone black, silica gel or activated carbon, which are employed to selectively remove constituents from liquids or gases by adsorption. These various substances are brought into condition for use initially or, following use are regenerated for reuse, by controlled heating, frequently in the presence of a gas. For example, the adsorbent clays used to improve the color of petroleum products are dehydrated and activated by the controlled application of heat and after use are regenerated by heating, preferably in an oxidizing atmosphere. All of the operations mentioned, whether of initial preparation or regeneration, are herein comprehended by the term condition. These operations have heretofore been carried out either in a furnace in which the heat was directly applied to the material and in which accurate control was difficult while the finished products were contaminated by combustion products or to a lesser extent in furnaces in which the heat was indirectly applied but which were complicated in construction and operation.

Our invention comprehends a type of furnace in which the heating may be indirect; the adsorbent material may be conditioned out of contact with combustion products of the fuels employed and in an atmosphere susceptible to accurate control. The degree of heat applied to the adsorbent materials may be accurately and closely controlled; any offensive odors or other undesirable products formed by the conditioning thereof may be automatically destroyed by discharging same into a combustion zone maintained within the apparatus and any adsorbent material carried away in suspension is automatically recovered. The apparatus is characterized by extreme simplicity in construction and operation and by the absence of moving parts.

Our invention further comprehends a type of furnace in which either direct or indirect heating may be alternately employed or may be simultaneously applied in any desired proportion. A further distinctive feature of our invention is that the air or other atmosphere contacted with the combustion products is, subsequent to such contact, conducted into indirect counter current heat exchanging relationship to the adsorbent material being heated, thereby resulting in marked fuel economies. Whereas under the prior art the heat content of the atmosphere contacted with the adsorbent material was usually lost, we provide means by which this heat content may be communicated to the adsorbent material and to a large extent saved. In cases where the adsorbent material contains considerable combustible material, as in the revivification of certain used clays in the oil industry, the heat thereby recovered may be sufficient to substantially or completely sustain the operation, thereby dispensing with the necessity for other fuels.

Referring to Fig. 1, the apparatus comprises a chamber 1, bounded by the front wall 2, roof 3 and rear wall 4. The side walls 5 appear in section in Fig. 2. This chamber is provided with an inclined floor 6. This floor consists of any suitable thermally conducting material adapted to indirect heating, such as a partition of tile or fire clay, silica, alundum or carborundum. A metal floor may be employed if desired, preferably composed of materials such as chromium alloys of high resistance to heat and oxidation. The inclination of the floor is greater than the angle of repose of the material to be conditioned so that any material flowing thereon automatically slides down the length of the floor. The hopper 7 provides a reservoir for the material to be conditioned and discharges through the spout 8 into the distributor 9. The distributor 9, Figs. 3 and 4, consists of an outer tubular member 10 open at the top and carrying at the bottom a delivery slot 11. The tubular member 10 carries in it a sleeve 12 open at the top to permit the adsorbent material to enter the same and is provided in the lower portion with a slot 13. The sleeve 12 is adapted to be moved through a part of a revolution within the tubular member 10 so that the slot 13 may be made to register with the slot 11, thereby permitting the free egress of the adsorbent material, or the distributor may be partially or completely closed thereby permitting any desired control of the flow of the adsorbent material. The partial revolution of the sleeve 12 and consequent flow control is effected by means of the bevel gears 14 and 15, controlled through the shaft 16 by the hand wheel 17.

The adsorbent material falls onto the inclined floor 6, preferably at or adjacent the upper portion thereof, and slides downwardly along the length of the floor. The movement of adsorbent material with relation to the floor would ordinarily be a simple telescopic flow. We find it advisable, however, to form into the floor some means for disturbing the flow and converting it into a turbulent flow, thereby thoroughly mixing the adsorbent material and bringing all parts of the same into contact with the floor and with the atmosphere in the chamber. Our preferred means for creating this turbulent flow consists of a series of downwardly inclined steps formed in the floor, preferably integral therewith, such as 18, illustrated in Fig. 1. The adsorbent material after having passed over the floor issues from the outlet 20 and may be diverted to storage, or to a cooler, not shown, or utilized in any conventional manner. Air, or any other desired atmosphere, may be admitted to the chamber 1 through the ports 21 and 22. An auxiliary means of heat is preferably provided for initiating the desired reaction, for temperature control or for any other purpose, by means of the burner 23 entering the receptacle through the port 24. The burner 23 is particularly advantageous when starting up as it permits the furnace to be operated at any desired capacity within a few minutes after starting and the burner 23 may be gradually cut down as the furnace warms up and the heat indirectly transmitted to the material through the floor 6 becomes adequate to maintain the operation. It will of course be apparent that both direct and indirect heat may be simultaneously applied to the material if desired.

We provide a means for applying heat to the under surface of the floor 6 so that the heat will be indirectly communicated to chamber 1 and the adsorbent material. Preferably the floor 6 surmounts a combustion chamber 25 enclosed by any suitable refractory material and fired through the port 26 by the burner diagrammatically indicated as 27. Additional air to support combustion may, if desired, be introduced through the port 28. The products of combustion pass from the combustion space through the outlets such as 29 and are discharged through the stack 30. If the conditioning of the adsorbent material is conducted in the presence of air or any other desired atmosphere, the gases, after contact, may contain combustibles or products of objectionable odor which it would be inadvisable to discharge directly into the atmosphere. Such gases are preferably conducted away from the chamber 1 through outlets such as 31 and carried downwardly through flumes 32, then discharged through outlets such as 33 and ducts such as 34 into the combustion space 25. This discharge preferably takes place in proximity to the burner 27 adjacent the lower part of floor 6 to facilitate the destruction and/or combustion of combustibles and/or odoriferous substances. In any event, it will be noted that the gases withdrawn from the conditioning chamber 1 are conducted in countercurrent heat exchanging relationship to the material descending on floor 6. This countercurrent contact is furthermore automatically maintained within our apparatus by the fact that the floor 6 is inclined upwardly from the point at which the said gases are discharged into contact with the lower surface thereof and such gases, after passing upwardly along the under side of floor 6 find escape through the duct 29 communicating with the stack 30. Where the material descending the slide contains considerable combustible material the gas withdrawn from chamber 1 and discharged into the chamber 25 may be admixed with additional air by the port 28 to complete combustion and this is frequently sufficient to support the entire operation, making it possible to entirely shut off the burners 23 and 27. The duct 34 provides in addition a space in which any adsorbent materials carried in suspension from chamber 1 are precipitated out of the gas stream and may be recovered. The floor 35 of this duct is preferably made to slope so that the precipitated adsorbent materials will gravitate to one end and automatically fall into position for convenient withdrawal from the apparatus. The door 36 is provided to permit the removal from the system of such adsorbent material.

The chamber 1, combustion space 25 and duct 34 may be divided into a number of longitudinally parallel sections. This feature of design may be determined in any case from the desired width of the apparatus and the known strengths of the materials of construction.

The method of operating the apparatus will be illustrated by a single example as applied to the regeneration of fuller's earth which has been employed to improve the color of a petroleum product. A quantity of used fuller's earth is charged into the hopper 7. The burner 23 is then started and when the conditioning chamber 1 has attained a desired temperature, say a dull red heat, adsorbent material is admitted by means of the distributor 9. It will of course be understood that the quantity of adsorbent material supplied and the degree of heat must be so proportioned as to satisfactorily condition adsorbent material in its descent through the apparatus. The burner 27 is started usually simultaneously with burner 23 and as the amount of heat transmitted through the floor 6 by the action of burner 27 and the combustion resulting from the oxidation of combustibles within chamber 25 becomes sufficient to support the operation, the burner 23 is gradually cut out. The ports 22 and 21 are opened to the point sufficient to supply the necessary air to complete oxidation of the impurities present in the fuller's earth. By manipulation of the port 28 or other draft control means it is possible to so regulate the draft conditions in the combustion chamber as to produce a pull on the duct 34 and flume 32 sufficient to draw all of the air which has passed over the absorbent material into the combustion space 25, while simultaneously introducing sufficient air through the chamber 25 to completely burn all combustibles in the gas withdrawn through the conditioning chamber 1, thereby insuring the complete destruction of combustibles and odoriferous matters present therein, and the complete utilization of any combustible material present in the gas which is passed over the adsorbent material. Any adsorbent material carried forward in suspension in the ₓ r admitted for oxidation is precipitated in the flume 32 and duct 34 and slides downward to a point adjacent the door 36. This material is preferably removed periodically by opening the door 36, and this may be done without disturbing to any extent conditions in the furnace. The conditioned adsorbent material, after sliding down the length of the floor 6, passes out of the apparatus through the outlet 20 and is preferably conducted to any suitable type of cooler and thereafter to storage or point of reuse.

It will, of course, be understood that the apparatus which we have specifically described is merely one specific embodiment of our invention and that the apparatus may be constructed in a wide variety of forms without departing from the fundamental features which we have disclosed. It is our intention that the invention be limited only by the appended claims in which we have endeavored to claim broadly all inherent novelty.

We claim:

1. Furnace for conditioning divided adsorbent materials, comprising an inclined stationary thermally conducting partition, a chamber surmounting said partition, means for delivering adsorbent material to be conditioned onto the upper surface of said partition, means for introducing air to said chamber adjacent the lower end of said partition, and means for applying heat to the under surface of said partition.

2. Furnace according to claim 1, comprising in addition means for applying heat directly to the upper surface of said partition.

3. Furnace for conditioning divided adsorbent material, comprising an inclined stationary thermally conducting partition, a chamber surmounting said partition, means for introducing air to said chamber adjacent the lower end of said partition, means for delivering adsorbent material to be conditioned onto the upper surface of said partition, means for producing turbulent flow of divided materials descending the same, and means for applying heat to the under surface of said partition.

4. Furnace for conditioning divided adsorbent material, comprising an inclined stationary thermally conducting partition, a chamber surmounting said partition, means for introducing air to said chamber adjacent the lower end of said partition, means for delivering adsorbent material to be conditioned onto the upper surface of said partition, a series of steps on the upper surface of said partition, and means for applying heat to the under surface of said partition.

5. Furnace for conditioning adsorbent material, comprising an inclined stationary thermally conducting partition, means for introducing air to said chamber adjacent the lower end of said partition, a chamber surmounting said partition, means for discharging adsorbent material in said chamber adjacent the upper end of said partition, an outlet from said chamber adjacent the lower end of said partition, and means for applying heat to the under surface of said partition.

6. Furnace for conditioning adsorbent material, comprising an inclined stationary thermally conducting partition, a chamber surmounting said partition, means for introducing air to said chamber adjacent the lower end of said partition, means for discharging adsorbent material in said chamber adjacent the upper end of said partition, an outlet from said chamber adjacent the lower end of said partition, a gas outlet from said chamber adjacent the upper end of said partition, a combustion chamber beneath said inclined partition, and a conduit connecting said gas outlet with said combustion chamber adjacent the lower end of said partition.

7. Furnace for conditioning adsorbent material, comprising a closed chamber, an inlet adjacent one end of said chamber, means for supplying divided adsorbent clay to said inlet, an outlet adjacent the other end of said chamber, means within said chamber for maintaining a continuous progression of divided adsorbent clay intermediate said inlet and outlet, means for supplying air to said chamber, a combustion chamber longitudinally in contact with said closed chamber and adapted to furnish heat to the interior of said closed chamber, a gas duct connected to said closed chamber, and a conduit connecting said duct with said combustion chamber.

8. Furnace for conditioning adsorbent material, comprising a closed chamber, an inlet adjacent one end of said chamber, means for supplying divided adsorbent clay to said inlet, an outlet adjacent the other end of said chamber, means within said chamber for maintaining a continuous progression of divided adsorbent clay intermediate said inlet and outlet, means for supplying air to said chamber, a combustion chamber longitudinally in contact with said closed chamber and adapted to furnish heat to the interior of said closed chamber, a gas duct connected to said closed chamber adjacent said inlet, and a conduit connecting said duct with said combustion chamber at a point adjacent the outlet from said closed chamber.

NORRIS S. EVANS.
CARL H. ALSBERG.